United States Patent
Kam et al.

(10) Patent No.: US 6,628,603 B1
(45) Date of Patent: Sep. 30, 2003

(54) DUAL LAYER OPTICAL STORAGE MEDIUM HAVING PARTIALLY REFLECTING LAYER COMPRISING ANTIMONY SULFIDE

(75) Inventors: Kam K. Kam, Woodbury, MN (US); William C. Mitchell, Arden Hills, MN (US); Mark A. Arps, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 821 days.

(21) Appl. No.: 08/826,112

(22) Filed: Mar. 27, 1997

(51) Int. Cl.[7] .............................. G11B 3/70; G11B 5/84; G11B 7/26

(52) U.S. Cl. ...................................................... 369/286

(58) Field of Search ........................... 369/13, 94, 283, 369/284, 286, 275.1; 430/945, 270.15; 428/64, 64.1, 913

(56) References Cited

U.S. PATENT DOCUMENTS

| | | | |
|---|---|---|---|
| 3,946,367 A | | 3/1976 | Wohlmut et al. ............. 369/32 |
| 4,219,704 A | | 8/1980 | Russell ..................... 179/100.3 |
| 4,383,029 A | * | 5/1983 | Yamada et al. ............. 430/541 |
| 4,385,372 A | | 5/1983 | Drexler ....................... 369/109 |
| 4,450,553 A | | 5/1984 | Holster et al. ........... 369/275.1 |
| 4,493,887 A | | 1/1985 | Peeters et al. ............... 430/275 |
| 4,735,878 A | | 4/1988 | Hamersley et al. ........... 430/11 |
| 4,905,215 A | | 2/1990 | Hattori et al. ................ 369/14 |
| 5,093,174 A | | 3/1992 | Suzuki et al. ................ 430/64 |
| 5,126,996 A | | 6/1992 | Iida et al. ................... 369/283 |
| 5,134,604 A | * | 7/1992 | Nagashima et al. .......... 369/94 |
| 5,171,392 A | | 12/1992 | Iida et al. ................ 156/273.3 |
| 5,202,875 A | | 4/1993 | Rosen et al. .................. 369/94 |
| 5,238,722 A | * | 8/1993 | Yashiro et al. ................ 428/64 |
| 5,251,198 A | | 10/1993 | Strickler ....................... 369/94 |
| 5,255,262 A | | 10/1993 | Best et al. ............... 369/275.1 |
| 5,303,224 A | | 4/1994 | Chikuma et al. ........ 369/275.1 |
| 5,303,225 A | | 4/1994 | Satoh et al. ............. 366/275.1 |
| 5,348,783 A | * | 9/1994 | Ohno et al. .................... 428/64 |
| 5,540,966 A | * | 7/1996 | Hintz ........................ 428/64.1 |
| 5,640,382 A | | 6/1997 | Florczak et al. ........ 369/275.13 |

FOREIGN PATENT DOCUMENTS

| | | |
|---|---|---|
| EP | 0 517 490 A2 | 12/1992 |
| EP | 0 520 619 A1 | 12/1992 |
| EP | 0 658 887 A1 | 6/1995 |
| EP | 0 706 178 A2 | 4/1996 |
| JP | 62-42343 | 2/1987 |
| JP | 63-145087 | 6/1988 |
| JP | 6-44611 | 2/1994 |
| JP | 6-155921 | 6/1994 |
| JP | 6-187662 | * 7/1994 |

OTHER PUBLICATIONS

"Double your capacity with DVD," by Dubs et al, Sep. 15, 1995.*

"IBM Scientists Demonstrate Multilevel Optical Disks; Could Increase Optical Data Capacities 10–Fold or More," IBM Press Release, May 12, 1994.

"New I.B.M. Laser Method Stacks Data on Disks," *N.Y. Times*, May 13, 1994.

Publication entitled "Double your capacity with DVD," by Dubs et al., Sep. 15, 1995.

* cited by examiner

*Primary Examiner*—Glenton B. Burgess
*Assistant Examiner*—Tod Kupstas
(74) *Attorney, Agent, or Firm*—Eric D. Levinson

(57) ABSTRACT

A multi-layer optical storage medium includes a transparent substrate, a partially reflective layer, a transparent spacer, and a highly reflective layer. One pattern of data pits is provided on the substrate, adjacent the partially reflective layer, and another pattern of pits is provided on the spacer layer, adjacent the highly reflective layer. The partially reflective layer may be made of antimony sulfide, such as antimony(III) sulfide, $Sb_2S_3$. The invention also includes the optical data storage systems compatible with such media.

16 Claims, 4 Drawing Sheets

US 6,628,603 B1

DUAL LAYER OPTICAL STORAGE MEDIUM HAVING PARTIALLY REFLECTING LAYER COMPRISING ANTIMONY SULFIDE

FIELD OF THE INVENTION

The present invention relates generally to the field of optical media, and more specifically to the area of optical media which employ two or more information storage layers.

BACKGROUND OF THE INVENTION

There is a seemingly never-ending demand in the field of data storage for media having increased storage capacity and performance. In the field of pre-recorded optical discs, such as compact discs and video discs, increased storage capacity is usually achieved by increasing the storage density per unit area of the disc. However, the maximum data storage density achievable in an optical recording system is limited by the smallest feature that the optical system can resolve. For conventional far-field imaging systems, the smallest resolvable feature size is limited by diffraction effects to approximately the wavelength of the available light source, usually a solid state laser diode. Thus, one method of increasing disc storage capacity is to decrease the wavelength of the laser diode. However, while the wavelengths available from laser diodes have been steadily decreasing, the decreases have not been dramatic due to limitations in solid state technology and materials.

A number of other techniques for increasing storage capacity of optical recording systems have been proposed. These include: (1) higher efficiency data coding schemes, e.g., pulse-width modulation; (2) optical and/or magnetic super-resolution; (3) zoned recording at constant angular velocity; (4) advanced data channel detection methods, such as partial response/maximum likelihood detection, and (5) recording on both the grooves and land areas of the disc.

While the preceding methods for increasing storage capacity all rely upon increasing the storage density per unit area of the disc, an alternative method for increasing the capacity of an optical disc is to employ additional storage layers on the disc which can be independently recorded or reproduced. Thus, the approach in this case is to increase the addressable area of the disc. This approach is attractive because it has the potential to substantially increase media storage capacity with only a modest increase in media and recording system complexity.

If multiple storage layers, e.g., 2, are to be read and/or written by optical beam(s) provided on one side of the disc, then one of the storage layers of the disc must be reflective enough so that it may be read and/or written by the optical beam(s), but transparent enough so that the beam(s) may penetrate the first storage layer and pass on to a second storage layer. However, such a disc has proved to be difficult to construct.

SUMMARY OF THE INVENTION

Accordingly, the present invention is directed to an optical storage medium having a partially reflective layer and a highly reflective layer, whereby data/servo information/format information may be stored on two different layers of the medium. In one embodiment, the medium includes an ordered stack of a transparent substrate, a partially reflective layer, a transparent spacer layer, and a highly reflective layer. The substrate has a pattern of pits in one of its major surfaces. The partially reflective layer may be adjacent the pit pattern side of the substrate. The partially reflective layer comprises antimony sulfide, such as $Sb_2S_3$, antimony(III) sulfide, or $Sb_2S_5$, antimony(V) sulfide. The partially reflective layer may consist essentially of antimony sulfide, which may be deposited in a variety of manners, including vapor deposition by vacuum sublimation or sputtering.

Another embodiment of the present invention includes a dual layer pre-recorded optical storage disc, comprising, in order, a transparent substrate, a partially reflective layer, a transparent spacer layer, and a highly reflective layer. A first data pit pattern is provided on one side of the disc. The partially reflective layer is adjacent the first pit pattern and comprises antimony sulfide.

The inventive optical storage medium has two aspects. In one aspect, the medium is designed to carry two or more layers of data/servo/format information which may be read by a drive capable of focusing on each of the two or more information layers. In this aspect, an optical storage system for use with the media would include the media as described above, a focused laser beam positioned to enter the medium through the substrate, means for adjusting the focal position of the laser beam, whereby the beam may be focused on either the partially reflective layer or the highly reflective layer, and a photodetector to detect the reflected laser beam exiting the medium. In this aspect, the preferred thickness for the partially reflecting layer is within the range from about 27 to 80 nm, or more preferably within the subranges of about 30 to 40 nm or 65 to 75 nm.

In a second aspect of the present invention, the optical storage medium is a disc which is designed for use with two different drives. The entire disc has a nominal thickness of 1.2 mm so that the pit pattern in the highly reflective layer may be read by a CD-ROM (compact disc-read only memory) drive having a 780 nm laser. The disc also has a substrate having a nominal thickness of about 0.6 mm, so that the pit pattern in the partially reflective layer may be read by a DVD-ROM (digital versatile disc) drive having a 650 nm laser. This would allow a pre-recorded disc seller to sell one disc that could be read by a consumer owning either a CD-ROM or DVD-ROM drive. (Of course, the CD-ROM version of the information would be expected to be less elaborate since the CD-ROM format does not allow for the same storage capacity as the DVD-ROM format.)

In this second aspect, the partially reflective layer preferably has a thickness in the range from about 128 to 140 nm. The reflectivity, $R_1$, of the highly reflective layer is preferably greater than 0.7 for 780 nm light, and the reflectivity, $R_2$, of the partially reflective layer is preferably greater than 0.2 for 650 nm light.

DETAILED DESCRIPTION

Figure 1:
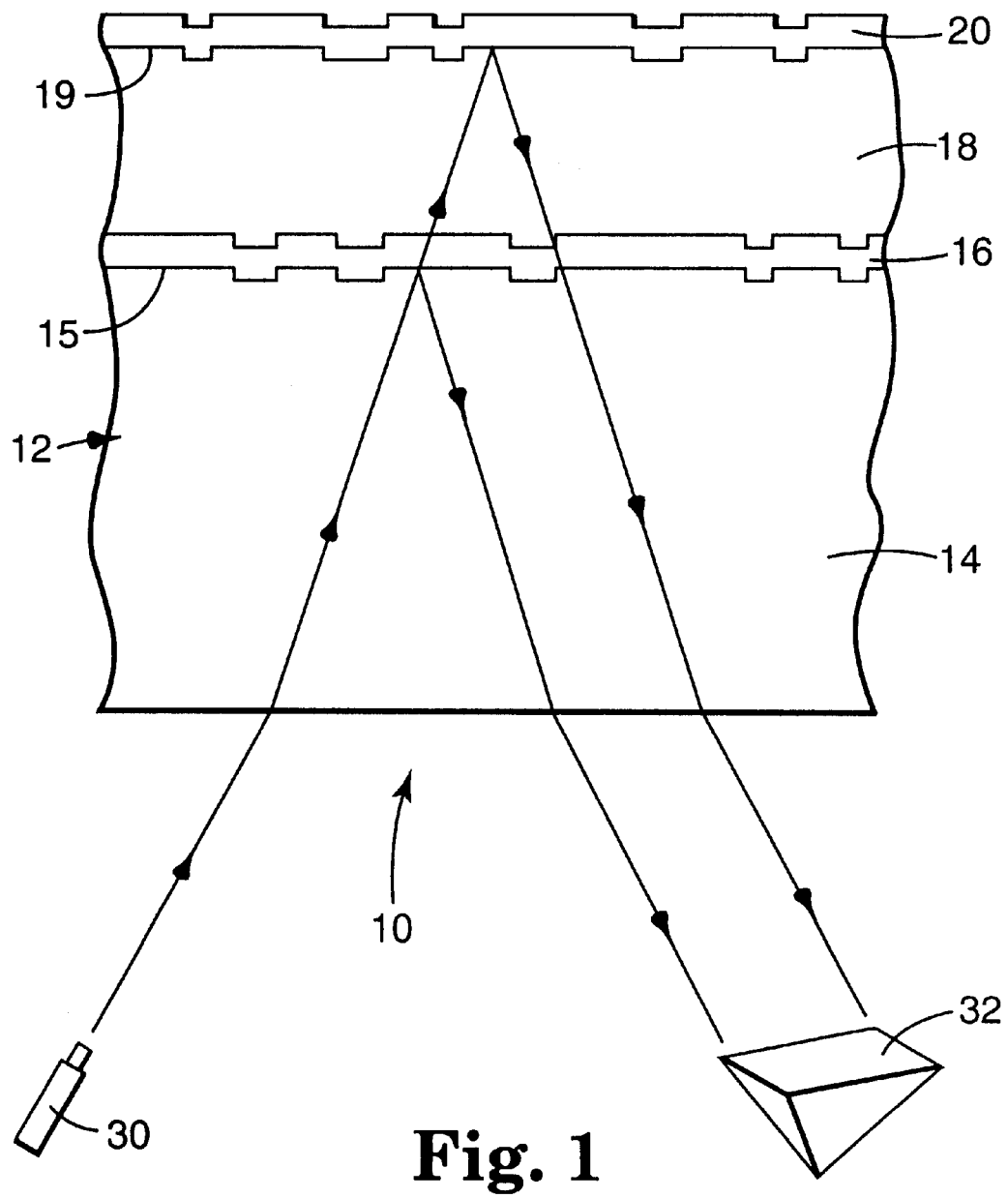
FIG. 1 shows an optical data storage system according to one embodiment of the present invention.

An optical data storage system 10 according to the present invention is shown in FIG. 1. Optical storage medium 12 comprises a transparent substrate 14, a partially reflective thin film layer 16 on a data pit pattern 15, a transparent spacer layer 18, and a highly reflective thin film layer 20 on or adjacent to a second pit pattern 19. An optional protective layer may be provided over highly reflective layer 20. As used herein, "pit pattern" means any pattern of pits or grooves that is capable of storing information, be it data, servo or tracking information, format information, etc. An optical laser 30 emits an optical beam toward medium 12, as shown in FIG. 1. Light from the optical beam which is reflected by either thin film layer 16 or 20 is sensed by detector 32, which senses modulations in light intensity based on the presence or absence of a pit in a particular spot on the thin film layers. Optionally, a double-sided dual layer disc could be formed by bonding two disc-shaped media 12 back-to-back so that the highly reflective layer 20 of each media was separated by an adhesive layer.

The capability for independently reading either the first or second pit pattern 15 or 19 is based on the comparatively limited focal depth characteristic of typical optical disc readout systems. The lenses employed in typical optical recorders/players to form a diffraction limited laser radiation spot on the media storage layer have moderately large (0.4 to 0.6) numerical apertures to improve resolution and increase storage density. Such lenses exhibit focal depths (i.e., the range of focus variation over which the focused spot size remains approximately diffraction limited) of about 2 $\mu$m; for large focus variations the size of the illuminated spot grows rapidly. Consequently, if partially reflective thin film layer 16 exhibits adequate transmission and the distance separating the two data pit patterns 15 and 19 is large relative to the optical system focal depth, it is possible to focus laser 30 on either data pit pattern with acceptably low "cross-talk" from the other data pit pattern. Thus, although the light from laser 30 will be reflected back toward detector 32 by both layers 16 and 20, only the layer upon which the laser is focused will strongly modulate the reflected light intensity, thereby enabling data readout.

The data pit patterns 15 and 19 on medium 10 can be reproduced most easily by first focusing on one of the reflective layers 16 or 20, and then reproducing the data on that entire layer before switching focal position to focus on the other reflective layer. In the alternative, it may be desirable to switch focus position one or more times before completely reproducing the data contained in one of data pit patterns 15 and 19. In either case, use of two data pit patterns separated by transparent layer 18 effectively doubles the data storage capacity of optical recording medium 10.

Transparent substrate 14 may be a polymeric material suitable for optical disc substrates which supports molding of data pit pattern 15 with sufficient fidelity, such as polycarbonate or amorphous polyolefin. Alternatively, it is possible to use a flat substrate of, for example, glass or polymethylmethacrylate, and form data pit pattern 15 by means of photopolymer replication, as will be described for the formation of data pit pattern 19.

Transparent spacer layer 18 may be a polymer, such as a photocurable polymer, which has a complex refractive index with a real component, n, ranging from about 1.45 to 1.6 and an imaginary component, K, of less than $10^{-4}$ and more preferably less than $10^{-5}$. Transparent spacer layer 18 should be thick enough to allow laser 30 to focus on either of data pit patterns 15 and 19 with a minimum of cross-talk. This translates into a thickness that is preferably within the range of from about 5 to 100 $\mu$m, and more preferably from about 30 to 50 $\mu$m.

Highly reflective layer 20 may be a metallic layer which exhibits high reflectivity at the laser wavelength used to reproduce the data. Currently available laser diode sources radiate at wavelengths ranging from about 600 to 850 nm. Aluminum, gold, silver, copper and their alloys can exhibit suitably high reflectivity in this wavelength range. Highly reflective layer 20 preferably has a reflectance of at least 70%, and more preferably at least 80% or higher, e.g., 85% or 95%.

In order to minimize the complexity and cost of optical data storage system 10, it is desirable that the average readout signal levels from each of the data pit patterns 15 and 19 be approximately equal. Thus, the apparent reflectivity's from layers 16 and 20, as seen by detector 32, should also be approximately equal.

As used herein, the term "apparent reflectivity" refers to the fraction of optical power incident upon transparent substrate 14 which, when focused to a spot on a flat region of either layer 16 or 20, could, in principle, be sensed by a photodetector in an optical readout device. It is assumed that the readout device comprises a laser, an appropriately designed optical path, and a photodetector. It is further assumed that the optical element in the optical path which is in closest proximity to transparent substrate 14 is a high (>0.4) numerical aperture objective lens. As used herein, the terms "internal surface reflectivity" or "internal interface reflectivity" refer to the fraction of optical power incident upon an interface within the media structure (e.g., the interface between transparent substrate 14 and partially reflective layer 16 or the interface between spacer layer 18 and highly reflecting layer 20) which is reflected.

In order to estimate the necessary reflectivity from partially reflective layer 16, we assume that highly reflective layer 20 reflects about 85%–95% of the light incident on the internal interface between spacer layer 18 and highly reflective layer 20. It is further assumed that the refractive index real component, n, of spacer layer 18 is 1.5, that substrate 14 is polycarbonate with a refractive index real component, n, of 1.57, and that reflections at the air-substrate interface do not contribute to the readout signal. If we further assume that partially reflective layer 16 is an ideal material which exhibits essentially no absorption (unlike previously used materials), it can be shown that a reflectivity of about 0.35, as observed at the internal interface between substrate 14 and the partially reflective layer will yield a balance in the apparent reflectivity's from layers 16 and 20.

We have discovered that an excellent material for partially reflective layer 16 is antimony sulfide, and more specifically $Sb_2S_3$ and $Sb_2S_5$. The real component (n) of the index of refraction for $Sb_2S_3$ was measured using films of $Sb_2S_3$ that were deposited in two different manners. $Sb_2S_3$ deposited by radio frequency (RF) magnetron sputtering (indicated by circles in FIG. 2) had a real component (n) which varied from about 3.8 at 400 nm to about 3.4 at 650 nm to about 3.2 at 800 nm. The imaginary component (K) of the refractive index (indicated by circles in FIG. 3) varied as follows: 1.3 at 400 nm, 0.7 at 500 nm, 0.3 at 600 nm, 0.2 at 650 nm, 0.1 at 725 nm, and 0.05 at 800 nm.

$Sb_2S_3$ deposited by vacuum sublimation (indicated by triangles in FIG. 2) had a real component (n) of the refractive index which varied from about 3.4 at 400 nm to about 3.2 at 650 nm to about 2.9 at 800 nm. The imaginary component (K) (indicated by triangles in FIG. 3) varied as follows: 1.0 at 400 nm, 0.5 at 500 nm, 0.2 at 600 nm, 0.15 at 650 nm, 0.05 at 700 nm, and about 0.01 at 800 nm.

For reference, the real (n) and imaginary (K) components of the refractive index of amorphous silicon carbide (a-SiC), which is disclosed in U.S. Pat. No. 5,540,966, was sputtered onto a glass slide. The real component (n) (indicated by squares in FIG. 2) of the a-SiC varied from about 3.0 at 400 nm to about 2.9 at 650 nm to about 2.8 at 800 nm. The imaginary component (K) (indicated by squares in FIG. 3) varied as follows: about 0.5 at 400 nm, 0.4 at 500 nm, 0.3 at 600 nm, and about 0.2 at 650, 700, and 800 nm.

Thus, $Sb_2S_3$ deposited by either sputtering (circles) or evaporation (triangles) had a higher real component (n) than a-SiC (squares) for all wavelength from 400 to 800 nm, with the sputtered $Sb_2S_3$ having the highest real component (n). $Sb_2S_3$ deposited by sputtering (circles) had a lower imaginary component (K) than a-SiC (squares) for wavelengths of 650 nm or larger. $Sb_2S_3$ deposited by evaporation (triangles) had a lower imaginary component (K) than a-SiC for wavelengths greater than 580 nm.

Figure 2:
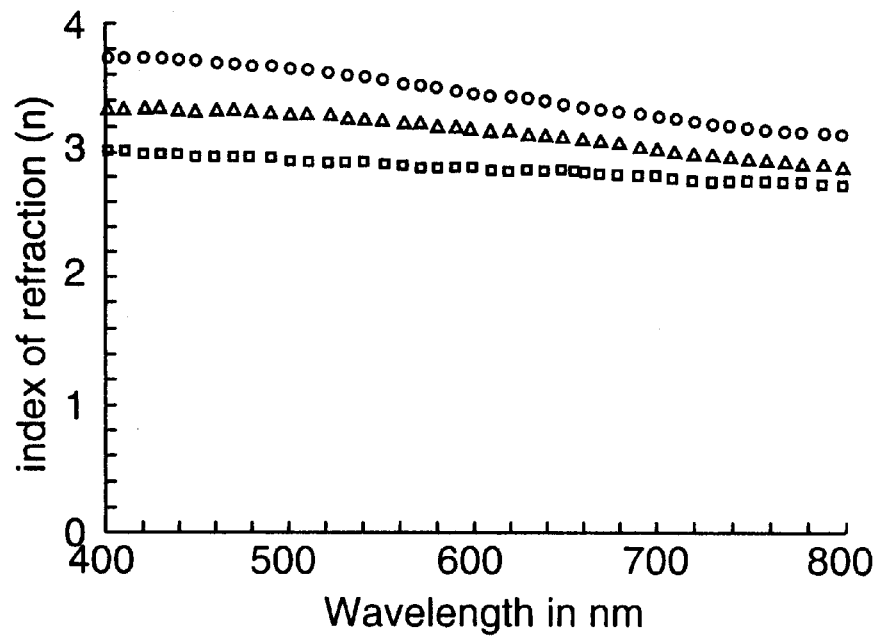
FIG. 2 is a graph of the real component (n) of the index of refraction of a 40 nm thick sample of $Sb_2S_3$ as a function of wavelength.
Figure 3:
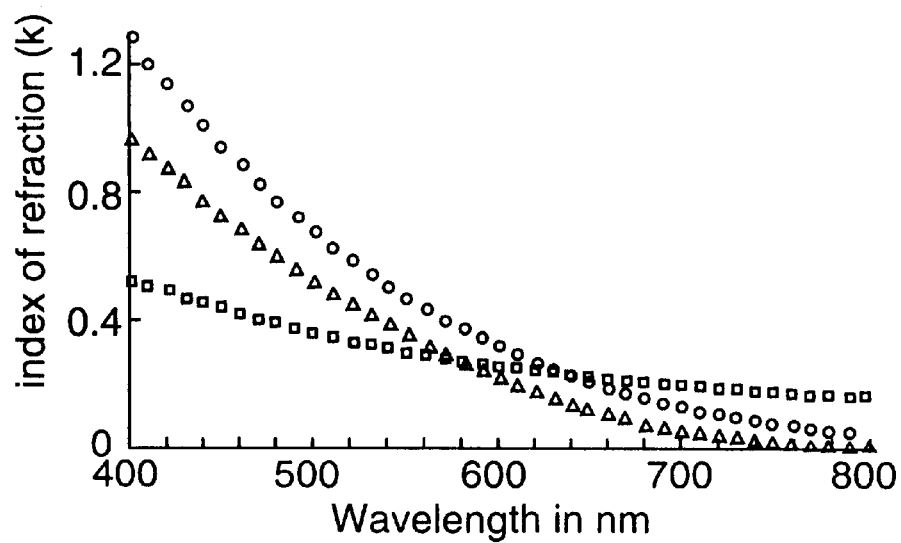
FIG. 3 is a graph of the imaginary component (K) of the index of refraction of a 40 nm thick sample of $Sb_2S_3$ as a function of wavelength.

As shown in FIG. 2, the refractive. index has a high (>3.0) real component (n) for a range of wavelengths from 600 nm to 740 nm. As shown in FIG. 3, the refractive index of $Sb_2S_3$ also has a very low imaginary component (K) over a range of wavelengths from 600 to 800 nm. A low K is necessary to allow the double transmission of light through partially reflective layer 16 without significant loss to enable readout of highly reflective layer 20. The combination of high real component (n) and low imaginary component (K) make $Sb_2S_3$ an ideal material for partially reflective layer 16.

The antimony(III) sulfide films analyzed in FIGS. 2 and 3 were prepared as follows: The sputtered films were prepared by radio frequency (RF) magnetron sputtering because the material is a semiconductor. The conductivity of the antimony(III) sulfide was too low for DC magnetron sputtering. The base pressure of the vacuum system prior to sputtering was less than $3 \times 10^{-7}$ Torr. The sputtering gas was argon (Ar) at a sputtering pressure of 2 mTorr. The distance between the sputtered target and the substrate was 8 cm. The forward sputter power was set to 25 watts. The deposition rate was less than 10 nm per minute. The rate can be much higher if the material can be sputtered by DC magnetron sputtering. This can be done if the target is doped with a small amount of conducting impurity such as boron or carbon. The imaginary part of the index of refraction, K, of the sputtered film may become higher than the undoped ones, but may still be low enough for the application disclosed here. The substrate was a glass slide.

The sublimed films of FIGS. 2 and 3 were prepared by vacuum sublimation of the source material in a glass bell jar vacuum coater. The pressure of the coater during coating was $2 \times 10^{-4}$ Torr or lower. The antimony(III) sulfide was loaded in a pyrex crucible resistively heated by a tantalum wire basket. The average deposition rate was 6 nm per minute. The substrate was a glass slide. Applicants have also deposited films of antimony(V) sulfide. Both $Sb_2S_3$ and $Sb_2S_5$ possess similar optical properties; however, it seems that the latter sublimes at a higher rate.

Although the measurements shown in FIGS. 2 and 3 were performed using $Sb_2S_3$, other stoichiometrics, such as $Sb_2S_5$, would have similar properties.

It is highly desirable that partially reflective layer 16 exhibit a reflectivity that is relatively constant over a range of thicknesses, thereby making control of film thickness and uniformity during manufacture less difficult. In addition to having a partially reflective layer for which reflectance changes only slowly with thickness variations, it is also desirable that the apparent reflectivities from layers 16 and 20 be approximately equal, and it is most desirable that both characteristics occur over the same range of partially reflective layer thicknesses. Stated differently, it is most desirable to have a media construction for which the apparent reflectivities from layers 16 and 20 are both substantially equal and insensitive to layer 16 thickness variations. This situation is depicted schematically in a computer-generated graph based on optical modeling shown in FIG. 4. The modeling was based on an optical stack comprising, in order, polycarbonate substrate 14, a partially reflecting layer 16 of $Sb_2S_3$ deposited by vacuum sublimation, a transparent polymer spacer 18, and a highly reflective layer 20 of AlCr having a reflectivity of about 85%. The thickness of the $Sb_2S_3$ partially reflecting layer was varied from 0 to 100 nm, and the reflectivity (R) was predicted for both reflecting layers (the $Sb_2S_3$ and AlCr).

Figure 4:
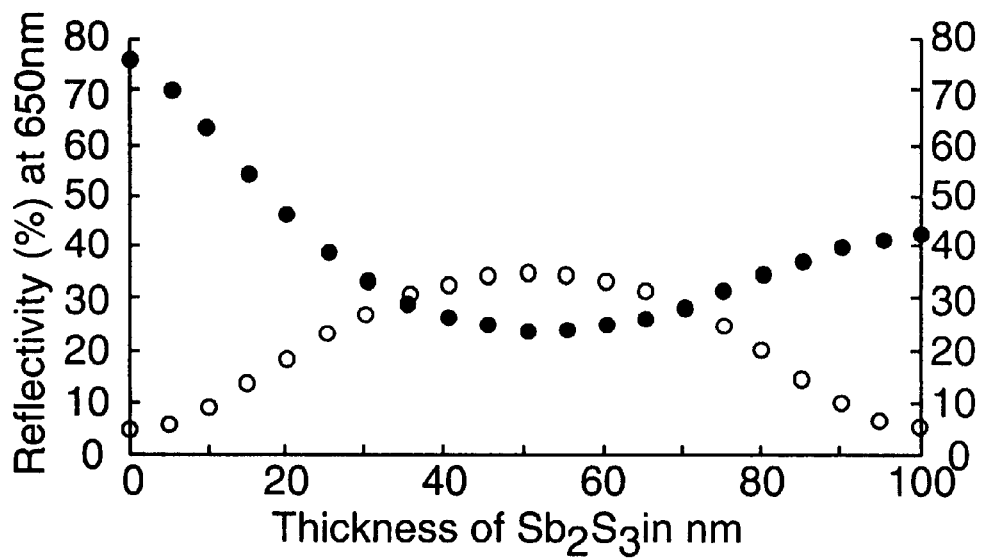
FIG. 4 is a computer-generated graph simulating reflectivities from the two reflective layers as a function of $Sb_2S_3$ thickness measured at a wavelength of 650 nm.

In FIG. 4, the apparent reflectivity at 650 nm of partially reflecting layer 16 ($Sb_2S_3$) is shown by open circles and the apparent reflectivity of highly reflective layer 20 (AlCr) is shown by filled circles. As shown in FIG. 4, the apparent reflectivities of the two layers vary by less than 0.12 over a range of thicknesses of the $Sb_2S_3$ layer from about 27 to 80 nm, with a reflectivity mean of 31%±6% (0.31±0.06). The two reflectivities are more closely balanced at $Sb_2S_3$ thicknesses ranging from 30 to 40 nm with a reflectivity mean of 31%±3% (0.31±0.03) and again from 65 to 75 with a reflectivity mean of 29%±3% (0.29±0.03). In an optical drive that is electronic noise limited, the high values of R relate to higher optical modulation (signal) and thus a higher signal-to-noise ratio in the detected data pattern.

Figure 5:
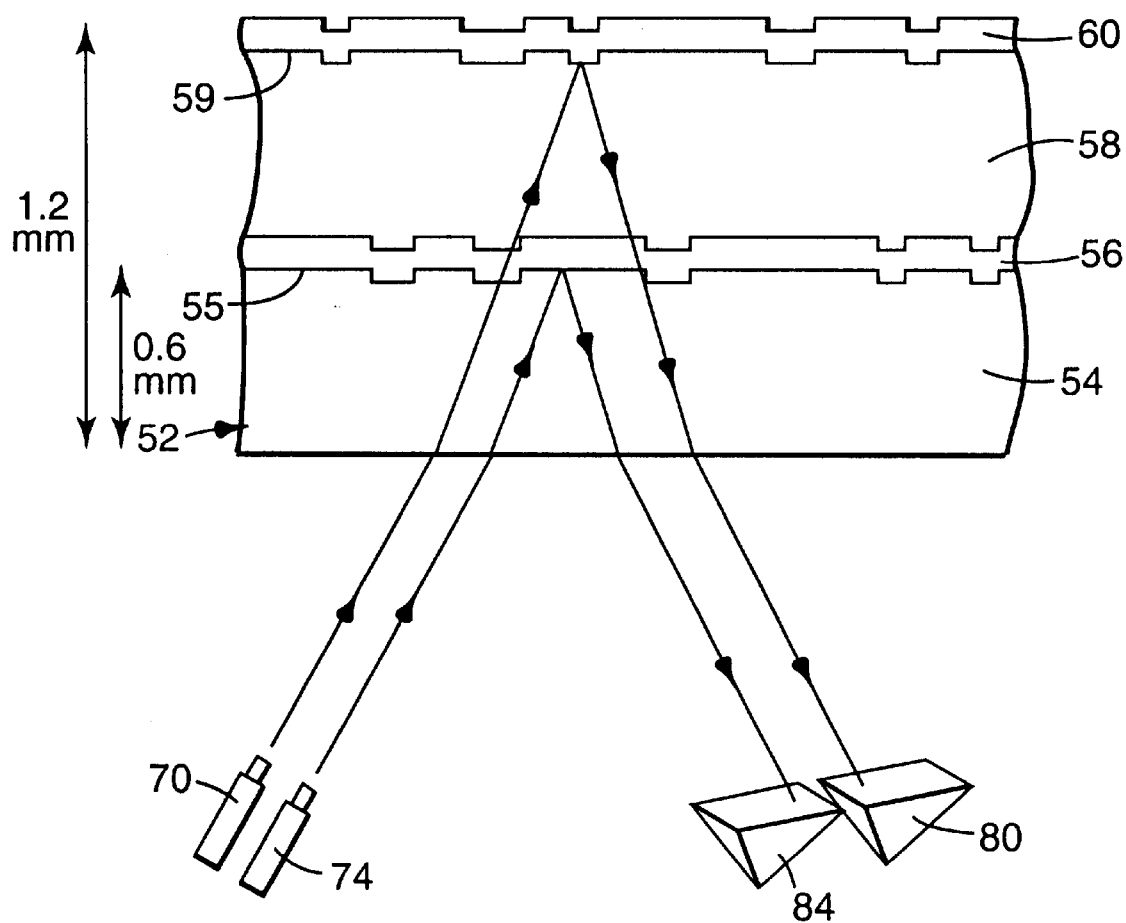
FIG. 5 shows an optical data storage disc adapted for use in two different data storage systems.

The present invention also includes a second embodiment shown in FIG. 5. Disc-shaped optical storage medium 52 comprises a disc-shaped transparent substrate 54, a partially reflective thin film layer 56 on a first data pit pattern 55, a transparent spacer layer 58, and a highly reflective thin film layer 60 on a second data pit pattern 59. The layers 54–60 are identical to layers 14–20, respectively, in FIG. 1, except as discussed below.

In a preferred version of this embodiment, substrate 54 has a nominal thickness of about 0.6 mm and the entire disc 52 has a nominal thickness of 1.2 mm. Disc 52 is designed for use in two different data storage systems. One system (a "first" system) uses a laser 70 having a relatively long wavelength (e.g., $\lambda$=780 nm). In this system, the beam from laser 70 passes through substrate 54, partially reflective layer 56 and spacer layer 58, and is focused on second data pit pattern 59. The beam from laser 70 is reflected by highly reflective layer 60 and passes back through spacer layer 58, partially reflective layer 56, and substrate 54, and is sensed by detector 80, which sensor modulations in light intensity based on the presence or absence of a pit on a particular spot on second pit pattern 59. It should be understood that typically laser 70 and detector 80 are part of the same disc drive and thus detector 80 is designed to work with laser 70.

Another system (a "second" system) in which disc 52 could be inserted is characterized by a laser 74 having a relatively short wavelength (e.g., 650 nm). In this system, the beam from laser 74 passes through substrate 54 and is focused on the first data pit pattern 55. The beam from laser 74 is reflected by partially reflective layer 56 and passes back through substrate 54 and is sensed by a detector 84. It should be understood that typically laser 74 and detector 84 are part of the same disc drive and thus detector 84 is designed to work with laser 74.

A disc such as disc 52 would be desirable for the following reason. One disc 52 could have two densities of information layers (patterns 55 and 59) on it. Second pit pattern 59 could have a first format, such as a low (or medium) density format like that used for compact disc read-only-memory (CD-ROM). Disc 52 could have a thickness of 1.2 mm (consistent with the CD-ROM specification) and second pit pattern 59, located adjacent highly reflective layer 60, could be read by a 780 nm laser (consistent with the CD-ROM specification).

The same disc 52 could also have a second information layer on it (pattern 55) but recorded at a different format density. First pit pattern 55 could have a second format, such as a high density format like that used for DVD-ROM (digital versatile disc). Substrate 54 could have a thickness of 0.6 mm (consistent with the DVD-ROM specification) and first pit pattern 55, located adjacent partially reflective layer 56, could be read using a 650 nm laser (consistent with the DVD-ROM specification).

Thus, one disc 52 could carry two versions of the same software—a shorter, simpler version in second pit pattern 59 for reading by a CD-ROM drive and a longer, more elaborate version in first pit pattern 55 for reading by a DVD-ROM drive. Thus, a software developer could sell a single disc which could be bought by anyone who had either a CD-ROM or a DVD-ROM drive. This could be of tremendous benefit as the pre-recorded disc industry begins to transition from CD-ROM drives to DVD-ROM drives.

However, recognizing the benefits of such a disc is not the same as designing one. Such a disc must have a reflectivity of greater than 0.2 (20%) at 650 nm for partially reflective layer 56 to satisfy the DVD-ROM specification and also have a reflectivity of greater than 0.7 (70%) at 780 nm for highly reflective layer 60 to satisfy the CD-ROM specification. Applicants have discovered that antimony sulfide meets these criteria.

Figure 6:
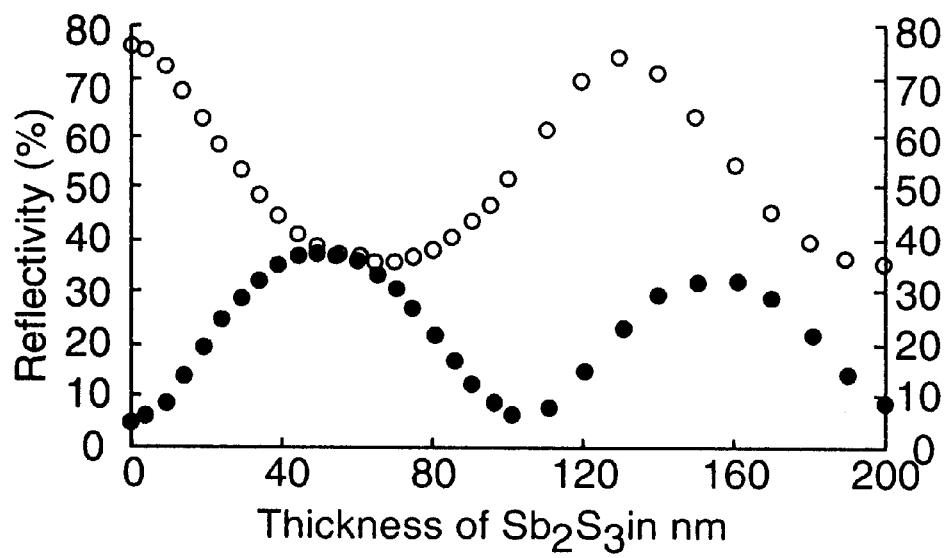
FIG. 6 is a computer-generated graph simulating reflectivity of the partially and highly reflective layer at 650 and 780 nm, respectively, as a function of $Sb_2S_3$ thickness.

FIG. 6 is a computer-generated graph simulating reflectivity of highly reflective layer 60 at 780 nm (open circles) and of partially reflecting layer 56 at 650 nm (filled circles) for the same optical stack modeled in FIG. 4 for various thicknesses of $Sb_2S_3$. We are interested in thicknesses for which the reflectivity of highly reflective layer 60 at 780 nm is greater than 70% and for which the reflectivity of partially reflecting layer 56 at 650 nm is greater than 20%. This occurs for $Sb_2S_3$ thicknesses between 128 nm and 140 nm.

$Sb_2S_3$ is also a desirable material for the partially reflecting layer due to its relatively high melting point (550° C.) which makes the coating process, e.g., sputtering, quite simple and the resulting film thermally stable, especially under a read laser beam even though the absorption coefficient of both $Sb_2S_3$ is very low at typical laser wavelengths. According to literature, $Sb_2S_3$ has been used as a major component in making safety matches. $Sb_2S_3$ takes much less power to sputter than silicon carbide (SiC), another partially reflecting material, presumably because of its relatively low melting point and higher vapor pressure. The sublimed film may be slightly non-stoichiometric because of dissociation.

Although $Sb_2S_3$ was used in the tests and simulations described, other stoichiometries of antimony sulfide would have similar physical properties. The invention is believed to apply to stoichiometries of antimony sulfide ranging from about $Sb_2S_3$ to $Sb_2S_5$. $Sb_2S_5$ seems to have a higher vapor pressure than its counterpart, $Sb_2S_3$, judging from their deposition rate. Sublimed $Sb_2S_5$ film seems to have lower absorption in the spectral region of interest (600–800 nm).

Those skilled in the art will appreciate that media 12 and 52 of the present invention are not restricted to pre-recorded media. For example, second data pit patterns 19 and 59 could be replaced with grooved or pitted patterns which provide tracking information to the drive. If a highly reflective, recordable material were used for highly reflective thin film layers 20 and 60, media 12 and 52, respectively, could contain pre-recorded information in first data pit pattern 15 and 55 while allowing data to be recorded by the user into layers 20 and 60. Thus, in this case, media 12 and 52 would each have one layer of pre-recorded data and one layer of user recordable information.

We claim:

1. A dual layer pre-recorded optical storage disc, comprising, in order:
a transparent substrate having a first data pit pattern in one major surface thereof;
a non-recordable partially reflective layer, adjacent the first data pit pattern, comprising antimony sulfide;
a transparent spacer layer;
a second data pit pattern; and
a highly reflective layer provided adjacent the second data pit pattern.

2. The disc of claim 1, wherein the partially reflective layer has a thickness within the range from about 27 to 80 nm.

3. The disc of claim 1, wherein the partially reflective layer has a thickness within the range from about 30 to 40 nm.

4. The disc of claim 1, wherein the partially reflective layer has a thickness within the range from about 65 to 75 nm.

5. The disc of claim 1, wherein the partially reflective layer has a thickness within the range from about 128 to 140 nm.

6. The disc of claim 1, wherein the antimony sulfide comprises antimony(III) sulfide.

7. The disc of claim 1, wherein the antimony sulfide comprises antimony(V) sulfide, $Sb_2S_5$.

8. The disc of claim 1, wherein the substrate has a thickness of about 0.6 mm, and wherein a substrate-incident light beam having a wavelength of 780 nm is reflected at the highly reflective layer at a reflectance, $R_1$, where $R_1 > 0.7$, and wherein a substrate-incident light beam having a wavelength of 650 nm is reflected at the partially reflective layer at a reflectance, $R_2$, where $R_2 > 0.2$.

9. The disc of claim 1, wherein the first data pit pattern contains a format designed for use with a first disc drive having a first laser beam having a first wavelength, $\lambda_1$, and wherein the second data pit pattern contains a second different format designed for use with a second different disc drive having a second different laser beam having a second different wavelength, $\lambda_2$, wherein $\lambda_2 > \lambda_1$.

10. The disc of claim 9, wherein the substrate has a thickness of about 0.6 mm and the entire disc has a thickness of about 1.2 mm.

11. An optical storage system for a dual layer pre-recorded optical storage disc, comprising:
a dual layer, pre-recorded optical storage medium, comprising, in order:
a transparent substrate having a first data pit pattern in one major surface thereof;
a non-recordable partially reflective layer comprising antimony sulfide;
a transparent polymer spacer layer; and
a second data pit pattern:

a highly reflective layer provided adjacent the second data pit pattern;

a focused laser beam positioned to enter the medium through the substrate;

means for adjusting focal position of the laser beam, whereby the beam may be focused on either the partially reflective layer or the highly reflective layer; and a photodetector positioned to detect the reflected laser beam exiting the medium.

12. The system of claim 11, wherein the substrate has a thickness of about 0.6 mm, and wherein a substrate-incident light beam having a wavelength of 780 nm is reflected at the highly reflective layer at a reflectance, $R_1$, where $R_1 > 0.7$, and wherein a substrate-incident light beam having a wavelength of 650 nm is reflected at the partially reflective layer at a reflectance, $R_2$, where $R_2 > 0.2$.

13. The system of claim 11, wherein the focused laser beam has a wavelength of 780 nm and is reflected at the highly reflective layer at a reflectance, $R_1$, where $R_1 > 0.7$.

14. The system of claim 11, wherein the focused laser beam has a wavelength of 650 nm and is reflected at the partially reflected layer at a reflectance, $R_2$, wherein $0.2 < R_2 < 0.4$.

15. The system of claim 11, wherein the antimony sulfide comprises antimony(III) sulfide, $Sb_2S_3$.

16. The system of claim 11, wherein the antimony sulfide comprises antimony(V) sulfide, $Sb_2S_5$.

* * * * *